United States Patent
Wohlert et al.

(10) Patent No.: US 9,786,200 B2
(45) Date of Patent: *Oct. 10, 2017

(54) ACOUSTIC REPRESENTATIONS OF ENVIRONMENTS

(71) Applicant: AT&T Intellectual Property I, L.P., Atlanta, GA (US)

(72) Inventors: Randolph Wohlert, Austin, TX (US); Milap V. Majmundar, Austin, TX (US); Aaron Bangor, Austin, TX (US); James H. Pratt, Round Rock, TX (US); Guido Corona, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/344,883

(22) Filed: Nov. 7, 2016

(65) Prior Publication Data

US 2017/0053561 A1    Feb. 23, 2017

Related U.S. Application Data

(63) Continuation of application No. 14/265,744, filed on Apr. 30, 2014, now Pat. No. 9,489,866.

(51) Int. Cl.
*G08B 21/02*    (2006.01)
*H04N 7/18*    (2006.01)
(Continued)

(52) U.S. Cl.
CPC .......... *G09B 21/006* (2013.01); *G08B 21/02* (2013.01); *G09B 21/00* (2013.01); *G08G 1/005* (2013.01); *G08G 1/16* (2013.01)

(58) Field of Classification Search
None
See application file for complete search history.

(56) References Cited

U.S. PATENT DOCUMENTS

| 6,523,006 B1 | 2/2003 | Ellis |
| 7,539,576 B2 | 5/2009 | Ohnishi et al. |

(Continued)

FOREIGN PATENT DOCUMENTS

| EP | 2371339 | 10/2011 |
| JP | 2008023237 | 7/2008 |
| KR | 100807180 | 2/2008 |

OTHER PUBLICATIONS

Jacob, Ricky et al., "Mobile Location Based Services: Non-Visual Feedback Using Haptics," SDIWC, pp. 45-53, 2013.

(Continued)

*Primary Examiner* — John Mortell
(74) *Attorney, Agent, or Firm* — Hartman & Citrin LLC

(57) ABSTRACT

Concepts and technologies are disclosed herein for acoustic representations of environments. A processor can execute an acoustic representation service. The processor can receive a request to provide acoustic representation data to a device. The processor can obtain input data from the device. The input data can include captured data. The processor can analyze the input data to recognize an object represented in or by the input data and a path associated with the object. The processor can generate acoustic representation data representing the object and the path, and provide the acoustic representation data to the device.

20 Claims, 7 Drawing Sheets

(51) Int. Cl.
*G09B 21/00* (2006.01)
*G08G 1/005* (2006.01)
*G08G 1/16* (2006.01)

(56) References Cited

U.S. PATENT DOCUMENTS

| | | | |
|---|---|---|---|
| 8,605,141 B2 | 12/2013 | Dialameh et al. | |
| 2012/0062357 A1* | 3/2012 | Slamka | G01C 21/20 340/4.11 |
| 2012/0124470 A1* | 5/2012 | West | G06F 3/0488 715/702 |
| 2012/0166077 A1* | 6/2012 | Herzog | G01C 21/3652 701/425 |
| 2013/0194402 A1* | 8/2013 | Amedi | A61H 3/061 348/62 |
| 2014/0058662 A1 | 2/2014 | Tachibana et al. | |

OTHER PUBLICATIONS

Blum, Jeffrey R. et al., "Spatialized Audio Environmental Awareness for Blind Users with a Smartphone," Mobile Networks and Applications Manuscript, Dec. 12, 2012 [retrieved from http://srl.mcgill.ca/publications/2012-monet.pdf on Apr. 29, 2014].

John Rempel, "Glasses That Alert Travelers to Objects Through Vibration? An Evaluation of iGlasses by RNIB and AmbuTech," AFB AccessWorld Magazine, 2012 [retrieved from http://www.afb.org/afbpress/pub.asp?DocID=aw130905 on Apr. 29, 2014].

American Printing House for the Blind, Inc., "Nearby Explorer User's Guide," Oct. 11, 2013 [retrieved from http://tech.aph.org/ne_info.htm on Apr. 29, 2014].

"VoiceOver for iOS," 2014, [retrieved from https://www.apple.com/accessibility/ios/voiceover/ on Apr. 29, 2014].

"Google Talkback," Dec. 13, 2013 [retrieved from https://play.google.com/store/apps/details?id=com.google.android.marvin.talkback on Apr. 29, 2013].

U.S. Office Action dated Oct. 13, 2015 in U.S. Appl. No. 14/265,744.

U.S. Office Action dated Mar. 3, 2016 in U.S. Appl. No. 14/265,744.

U.S. Notice of Allowance dated Jun. 17, 2016 in U.S. Appl. No. 14/265,744.

* cited by examiner

ACOUSTIC REPRESENTATIONS OF ENVIRONMENTS

CROSS-REFERENCE TO RELATED APPLICATIONS

This application is a continuation of and claims priority to U.S. patent application Ser. No. 14/265,744, entitled "Acoustic Representations of Environments," filed Apr. 30, 2014, now U.S. Pat. No. 9,489,866, which is incorporated herein by reference in its entirety.

BACKGROUND

Wireless communications devices such as tablets and smartphones have become nearly ubiquitous among modern consumers, perhaps due to their usefulness for messaging, navigation, and other functions. These devices sometimes support various operations for providing useful information to consumers such as, for example, traffic reports, ratings and reviews, news, product and service information, combinations thereof, or the like. In some instances, data is presented to a user of the devices via a display, though some information may be presented to users via audible or tactile feedback such as ringers, vibration alert devices, or the like.

Users also can interact with the devices to input information. In various embodiments, the information can be input using a touchscreen, a multi-touch screen, a keyboard, voice commands, combinations thereof, or the like. While these devices can be useful for many users, some users may not be able to access functionality. For example, a user who is blind or has low vision may be unable to use a traditional display generated by a navigation application of a smartphone, since the navigation application may be configured to convey information using a map display. Similarly, if a touchscreen is used to present a dynamic keyboard or other input interface, a user who is blind or has low vision may be unable to easily input information using the designated input mechanisms as the key locations and/or configurations may change in various applications and/or environments, and these changes may be undetectable to a blind or low vision user.

In the case of a user who is blind or who has low vision (e.g., ablepsia, anopia, or the like), a user who is deaf or has other hearing impairment (e.g., paracusis), and/or a user who has one or more of various physical, cognitive, and/or sensory impairments or disabilities, various obstacles and/or threats may exist in the outside world that may be undetected by the user due to the impairment and/or disability. For example, a deaf or hearing impaired user may not recognize the sound of an approaching vehicle, a blind user or user who has low vision may not see an obstacle in his or her path, or the like. As a result, some users of wireless communications devices and/or other devices may be unable to access some functionality of the devices, or may be unable to use the functionality in a meaningful way.

SUMMARY

The present disclosure is directed to acoustic representations of environments. Information about a proximity of a user can be gathered. The information can include, for example, location information, sensor readings, audio signals captured with a microphone or other audio capture device, video, photographs, or other visual information captured with an image capture device, combinations thereof, or the like. The information also can include data captured by and/or obtained from other devices such as traffic information systems, crosswalk systems, traffic light systems, weather systems, location servers, combinations thereof, or the like. In one embodiment, a three hundred sixty degree video device can be worn by a user and can function as an accessory for a user device to provide the video to the user device.

The user device can execute an acoustic representation application that can be configured to capture the information. The acoustic representation application also can obtain preferences from a user or other entity. The preferences can define types of information the user wishes to receive, alerts and/or notifications the user wishes to receive, as well as formats for the alerts, notifications, information, and/or other output. The user device can provide input data that includes preferences, captured data, and/or other information to an acoustic representation service executed by a server computer. In some embodiments, the user device can be configured to perform preprocessing of the input data such as, for example, object recognition, object path determination, or the like, to determine if frame rates of video are to be adjusted, if quality of captured audio is to be adjusted, how often location and/or sensor readings are to be provided to the service, combinations thereof, or the like.

The acoustic representation service can store the preferences and/or other information relating to the user and/or the user device in a data store as user data. The acoustic representation service also can be configured to build and/or maintain an object library that includes data identifying various objects that may be encountered by the user of user device. The object library can be built by a user via the acoustic representation service, or can be stored by the acoustic representation service without involvement of the user.

The acoustic representation service can analyze the input data, the user data, the object library, and/or other information to identify objects and/or object paths represented in or by the input data. As used herein, thus, the acoustic representation service can identify objects in a proximity of the user device and paths of those objects in absolute terms (e.g., paths of the objects in the real world) or relative terms (e.g., paths of the objects relative to the user device). Based upon the analysis, the acoustic representation service can generate acoustic representation data that represents the environment, objects in the environment, paths of the objects, combinations thereof, or the like. The acoustic representation service can provide the acoustic representation data to the user device.

The user device can receive the acoustic representation data and generate, based upon the acoustic representation data, an acoustic representation of the environment. The user device can provide the acoustic representation to a user or other entity. In some embodiments, the acoustic representation can be provided to the user as audio output. The audio output can be provided using various signals or sounds, spoken information, combinations thereof, or the like. In some embodiments, the audio output can be supplemented or replaced with other types of output such as, for example, refreshable braille output display output, haptic vibration, voice recordings, earcons, visual displays, combinations thereof, or the like.

The audio output can inform a user regarding his or her environment. The audio output can be provided, for example, via headphones to represent the environment using audio signals. In some embodiments, the acoustic representation can be provided using tactile or haptic feedback in addition to, or instead of, the audible information. The concepts and technologies described herein can be used to support object tracking, to navigate users between destinations, to recognize and warn users regarding obstacles, threats, or other objects in their paths, and/or for other purposes.

According to one aspect of the concepts and technologies described herein, a method is disclosed. The method can include receiving, at a processor executing an acoustic representation service, a request to provide acoustic representation data to a device. The processor can obtain input data from the device. The input data can include captured data. The processor can analyze the input data to recognize an object represented in or by the input data and a path associated with the object. The processor can generate acoustic representation data representing the object and the path, and provide the acoustic representation data to the device.

In some embodiments, the method also can include determining, by the processor, if device-side processing is available. The device-side processing can include preprocessing of the captured data included in the input data. The preprocessing can be performed by the device. The device-side processing can include analysis of the captured data to determine a frame rate for video included in the captured data. In some embodiments, in response to a determination that the device-side processing is available, the method further can include instructing, by the processor, the device to activate the device-side processing.

In some embodiments, the method also can include determining, by the processor, if an alert should be issued to the device, and if a determination is made that the alert should be issued, pushing, by the processor, the alert to the device. Instead of pushing the alert, some embodiments include providing the alert to the device using other communication schemes and/or technologies. According to some embodiments, the device can execute an acoustic representation application, and the device can present an acoustic representation based upon the acoustic representation data.

In some embodiments, the method also can include storing preferences associated with the device. The preferences can include data identifying objects that are to be tracked, alerts that are to be provided, and how an acoustic representation based upon the acoustic representation data is provided at the device. In some embodiments, the method also can include receiving, by the processor, a request to build an object library, obtaining, by the processor, another input data from the device, identifying, by the processor, another object represented by the other input data, and adding, by the processor, data identifying the other object to the object library. In some embodiments, the captured data can include data captured by collection hardware. The data can include video, audio, and a sensor reading obtained via a sensor of the device. The video can include three hundred sixty degree video.

According to another aspect of the concepts and technologies described herein, a system is disclosed. The system can include a processor and a memory. The memory can store computer-executable instructions that, when executed by the processor, cause the processor to perform operations. The operations can include receiving a request to provide acoustic representation data to a device and obtaining input data from the device. The input data can include captured data. The operations also can include analyzing the input data to recognize an object represented in or by the input data and a path associated with the object. The path can be an absolute path (e.g., an actual trajectory of the object) or a relative path (e.g., a path of movement relative to a user or user device). The operations also can include generating acoustic representation data representing the object and the path, and providing the acoustic representation data to the device.

In some embodiments, the memory also stores computer-executable instructions that, when executed by the processor, cause the processor to perform operations further including determining if an alert should be issued to the device, and if a determination is made that the alert should be issued, providing the alert to the device. In some embodiments, the memory also stores computer-executable instructions that, when executed by the processor, cause the processor to perform operations further including storing preferences associated with the device. The preferences can include data identifying objects that are to be tracked, alerts that are to be provided, and how an acoustic representation based upon the acoustic representation data is provided at the device.

In some embodiments, the memory stores computer-executable instructions that, when executed by the processor, cause the processor to perform operations further including receiving a request to build an object library, obtaining another input data from the device, identifying another object represented by the other input data, and adding data identifying the other object to the object library. The device can include a smartphone that executes an acoustic representation application. The device can communicate with accessories. The accessories can include a three hundred sixty degree video capture device to capture video and headphones to provide an acoustic representation output by the device.

According to yet another aspect of the concepts and technologies described herein, a computer storage medium is disclosed. The computer storage medium can have computer-executable instructions stored thereon that, when executed by a processor, cause the processor to perform operations. The operations can include receiving a request to provide acoustic representation data to a device, obtaining input data from the device, the input data including captured data, analyzing the input data to recognize an object represented in or by the input data and a path associated with the object, generating acoustic representation data representing the object and the path, and providing the acoustic representation data to the device.

In some embodiments, the computer storage medium can include computer-executable instructions that, when executed by the processor, cause the processor to perform operations further including receiving a request to build an object library, obtaining another input data from the device, identifying another object represented by the other input data, and adding data identifying the other object to the object library. In some embodiments, the computer storage medium also can include computer-executable instructions that, when executed by the processor, cause the processor to perform operations further including receiving a request to track a user object, analyzing captured data to identify the user object, wherein the user object is identified based upon the object library, identifying the user object based upon the analysis of the captured data, and providing output to the device, the output including data corresponding to tracking of the user object.

In some embodiments, the computer storage medium further can include computer-executable instructions that, when executed by the processor, cause the processor to perform operations further including storing preferences associated with the device. The preferences can include data identifying objects that are to be tracked and alerts that are to be provided to the device. In some embodiments, the computer storage medium further can include computer-executable instructions that, when executed by the processor, cause the processor to perform operations further including determining if an alert should be issued to the device, and if a determination is made that the alert should be issued, providing the alert to the device.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
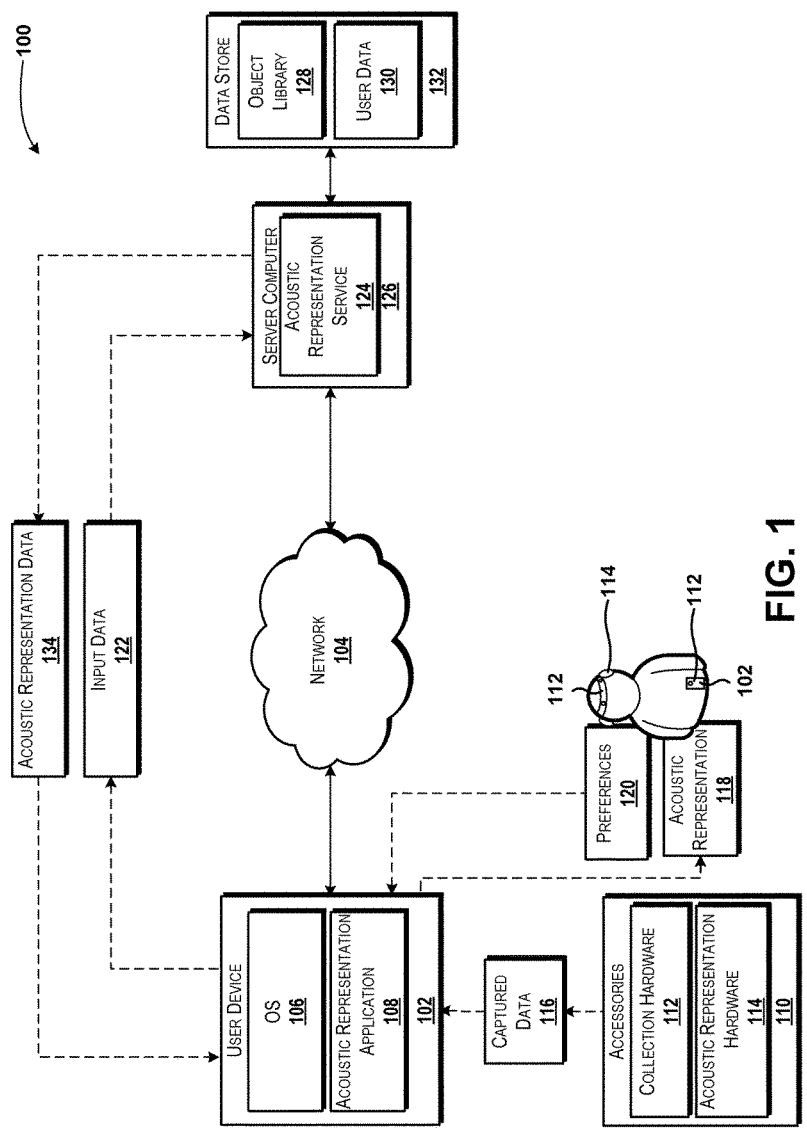
FIG. 1 is a system diagram illustrating an illustrative operating environment for the various embodiments disclosed herein.

The following detailed description is directed to acoustic representations of environments. Information about a proximity of a device such as a user device can be gathered. The information can include various types of information such as, for example, location information, sensor readings, audio signals captured with a microphone or other audio capture device, video, photographs, or other visual information captured with an image capture device, traffic information system data, crosswalk system data, traffic light system data, weather data, combinations thereof, or the like. The user device can execute an acoustic representation application that can be configured to capture the information and/or to provide the information to other devices, systems, services, or nodes.

The acoustic representation application also can obtain and store preferences for a user or other entity. The preferences can define types of information the user wishes to receive, alerts and/or notifications the user wishes to receive, as well as formats for the information, alerts, notifications, and/or other output. The user device can provide input data that includes preferences, captured data, and/or other information to an acoustic representation service executed by a server computer. The acoustic representation service can store the preferences and/or other information relating to the user and/or the user device in a data store as user data.

The acoustic representation service can analyze the input data and other information such as user data and an object library to identify objects and/or object paths represented in or by the input data. Based upon the analysis, the acoustic representation service can generate acoustic representation data that represents the environment, objects in the environment, paths of the objects, combinations thereof, or the like. The acoustic representation service can provide the acoustic representation data to the user device.

The user device can receive the acoustic representation data and generate, based upon the acoustic representation data, an acoustic representation of the environment. The user device can provide the acoustic representation to a user or other entity. In some embodiments, the acoustic representation can be provided to the user as audio output, tactile feedback, visual information, combinations thereof, or the like. The concepts and technologies described herein can be used to support object tracking, to navigate users between destinations, to recognize and warn users regarding obstacles, threats, or other objects in their paths, to help locate objects, for other purposes, combinations thereof, or the like.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for acoustic representations of environments will be described, according to an illustrative embodiment. The operating environment 100 shown in FIG. 1 includes a user device 102 operating in communication with and/or as part of a communications network ("network") 104.

According to various embodiments, the functionality of the user device 102 may be provided by one or more server computers, desktop computers, mobile telephones, laptop computers, set-top boxes, other computing systems, and the like. It should be understood that the functionality of the user device 102 can be provided by a single device, by two similar devices, and/or by two or more dissimilar devices. For purposes of describing the concepts and technologies disclosed herein, the user device 102 is described herein as a smartphone. It should be understood that this embodiment is illustrative, and should not be construed as being limiting in any way.

The user device 102 can execute an operating system 106 and one or more application programs such as, for example, an acoustic representation application 108. The operating system 106 is a computer program for controlling the operation of the user device 102. The acoustic representation application 108 is an executable program configured to execute on top of the operating system 106 to provide the functionality illustrated and described herein for generating and presenting acoustic representations of environments.

The acoustic representation application 108 can be configured to communicate with one or more accessories 110 to exchange data. Although the accessories 110 are illustrated in FIG. 1 as being separate from the user device 102, it should be understood that some embodiments of the user device 102 can include some or all of the components illustrated and described herein with respect to the accessories 110. As such, the embodiment shown in FIG. 1 should be understood as being illustrative and should not be construed as being limiting in any way.

The accessories 110 can include collection hardware 112 and acoustic representation hardware 114. The collection hardware 112 can be used to capture data and to provide the captured data 116 to the user device 102. The captured data 116 can include, for example, sensor readings, video, audio, imagery, orientation information, combinations thereof, or the like. Thus, as shown in FIG. 1, the collection hardware 112 can include, for example, the user device 102. As illustrated and described herein with reference to FIG. 7, the user device 102 can include various sensors and/or data collection capabilities, any or all of which can be included as the collection hardware 112 illustrated and described herein.

The collection hardware 112 also can include, for example, an imaging device that can capture video in three hundred sixty degrees, thereby enabling collection of video or other imagery from all sides of the user or other entity. Although the imaging device can be a component of the user device 102, some embodiments of the concepts and technologies described herein include a three hundred sixty degree imaging device that can be separate from the user device 102. It should be understood that this example is illustrative and therefore should not be construed as being limiting in any way.

In another contemplated embodiment, the collection hardware 112 can include, for example, an audio capture device or array of audio capture devices that can capture audio in three dimensions and/or in three hundred sixty degrees about a user, device, or other entity. Thus, the collection hardware 112 can be configured to generate monaural or binaural audio data. It should be understood that according to various embodiments, the collection hardware 112 can include active and/or passive collection devices.

According to various other embodiments, the collection hardware 112 also can include infrared ("IR") emitter and/or capture devices; radio signal emitters, receivers, and/or transceivers; ultrasonic emitters and/or receivers; combinations thereof; or the like. As such, the collection hardware 112 can capture data that defines and/or represents spatial relationships at or in proximity to the user device 102. Thus, as used herein, "spatial" data can be captured by the collection hardware 112 to represent objects and/or devices at or near a user device 102, the collection hardware 112, and/or other entities. It should be understood that this example is illustrative and therefore should not be construed as being limiting in any way.

Although the collection hardware 112 is shown in FIG. 1 as a component of the accessories 110 and is described herein as also being capable of inclusion in the user device 102, it should be understood that various embodiments of the concepts and technologies described herein also support communication with additional and/or alternative collection hardware 112 that is remote from the accessories 110 and/or the user device 102. In particular, some embodiments of the concepts and technologies described herein support communications between the user device 102 and various types of collection hardware 112 such as, for example, traffic lights, crosswalk lights, traffic systems and/or traffic data servers, location servers, vehicle communication devices, government information services and devices, video and/or sensor-enabled canes or other devices, combinations thereof, or the like. Thus, the acoustic representation application 108 can obtain data from a variety of sources, according to various embodiments of the concepts and technologies described herein. Thus, the examples of collection hardware 112 illustrated and described herein are illustrative and should not be construed as being limiting in any way.

In some embodiments, the acoustic representation application 108 can analyze the captured data 116 using on-board processing capabilities of the user device 102. In some embodiments, the acoustic representation application 108 can forward the captured data 116 to other devices, systems, or services, as will be explained in more detail below.

The acoustic representation application 108 also can generate an acoustic representation 118, which will be explained in more detail herein. Briefly, the acoustic representation 118 can include a "rendering" of an environment. As used herein, an "acoustic" representation such as the acoustic representation 118 can be provided as an audio-only representation of an environment. In some other embodiments, the acoustic representation 118 can be provided as a non-audio representation of an environment and/or other non-audio output such as haptic or tactile output, output for a braille display, earcons and/or modulated earcons, vibracons and/or modulated vibracons, text displays, or the like.

In some other embodiments, the acoustic representation 118 can be provided as a visual representation of an environment or other visual output such as icons, visual displays of threats (e.g., a simplified visual representation of the threats), text displays, or the like. In still other embodiments, the acoustic representation 118 can be provided as a combination of audio and non-audio output; a combination of audio, tactile, and visual output; a combination of visual and haptic or tactile output; other types of output; combinations thereof; or the like. In some embodiments, the acoustic representation 118 can be provided using audio signals such as, for example, spoken information or alerts, sounds, combinations thereof, or the like. The acoustic representation 118 can be provided to a user or other entity, for example, through headphones, displays, haptic devices attached to one or more body parts of a user or other entity, braille displays or other output devices, combinations thereof, or the like. It therefore can be appreciated that the acoustic representation 118 illustrated and described herein can include multi-modal and/or multi-sensorial output or representations and therefore may not be limited to audio output (or may even exclude audio output). As recited in the claims, an "acoustic representation" includes a representation of an environment that is generated using audio output without haptic and/or visual output (unless separately recited). It should be understood that this embodiment is illustrative and therefore should not be construed as being limiting in any way.

As noted above, in some embodiments, the acoustic representation 118 can include non-audio output. In some contemplated embodiments, the acoustic representation 118 can be supplemented by (or replaced with) output for a braille display. For example, in some embodiments the acoustic representation hardware 114 can include a refreshable braille display, and as such, the acoustic representation 118 can output to drive display of information on the refreshable braille output display. Because other types of non-audio output are possible and are illustrated and described herein, it should be understood that this example is illustrative and therefore should not be construed as being limiting in any way.

The acoustic representation application 108 also can be configured to obtain preferences 120. The preferences 120 can include, for example, data indicating what notifications are to be received, data indicating what types of notifications are to be received, data indicating what alerts are to be received, data indicating what types of alerts are to be received, data indicating what users are associated with the user device 102, data indicating what users are associated with the one or more services that can help provide or generate acoustic representations 118 and/or data used to generate the acoustic representations 118, user information such as data indicating that a user associated with the user device 102 is blind or has low vision, is deaf or is otherwise hearing impaired, has sensory, physical, and/or cognitive impairments or disabilities, or the like; data indicating what objects are to be recognized and/or tracked during execution of the acoustic representation application 108; data indicating what object paths are to be recognized and/or tracked during execution of the acoustic representation application 108; data indicating how libraries of objects are generated and/or stored; combinations thereof; or the like. Because the preferences 120 can include additional and/or alternative information, it should be understood that these examples are illustrative and therefore should not be construed as being limiting in any way.

The acoustic representation application 108 can be configured to provide the preferences 120 and the captured data 116 to other devices, systems, services, or nodes as input data 122. In the illustrated embodiment, the input data 122 can be provided to an acoustic representation service 124. According to various embodiments, the acoustic representation service 124 can include a server application or module executed or hosted by a computing device such as a server computer 126. According to some embodiments, the acoustic representation service 124 can be a callable service that can be configured to generate acoustic representation data 134, and to provide the acoustic representation data 134 to the user device 102. In some embodiments, the acoustic representation service 124 can provide the acoustic representation data 134 in response to a request or call from the user device 102.

In particular, in some embodiments of the acoustic representation service 124 can receive an explicit request (not shown in FIG. 1) from the user device 102. Thus, for example, a user can select an option within an application, web page, and/or other environment to obtain or generate an acoustic representation 118. Because other types of explicit requests are possible and are contemplated, it should be understood that this example is illustrative and therefore should not be construed as being limiting in any way.

In some other embodiments, the acoustic representation service 124 can receive an implicit request, for example, by receiving the input data 122. Thus, the acoustic representation service 124 can be configured to recognize an arriving or received instance or stream of input data 122 as an implicit request to provide data for generating an acoustic representation 118. Because the acoustic representation service 124 can detect an implicit or explicit request for data in various additional and/or alternative ways, it should be understood that these examples are illustrative and therefore should not be construed as being limiting in any way.

According to various embodiments, the acoustic representation service 124 can analyze the input data 122 to detect objects and/or object paths associated with the objects, as well as a movement or path associated with the user device 102. In various embodiments, the acoustic representation service 124 can analyze the input data 122 using an object library 128 and/or user data 130. The object library 128 can include data identifying objects and can be used for object recognition functionality. The user data 130 can include user preferences, settings, configurations, options, identity information, and the like. The object library 128 and the user data 130 are illustrated and described in further detail below.

The object library 128 and/or the user data 130 can be stored in a data storage device such as a data store 132, or the like. According to various embodiments, the object library 128 and/or the user data 130 can be stored with data or other information that can associate the object library 128 and/or the user data 130 with other information such as locations, users, accounts, addresses, devices, combinations thereof, or the like. The object library 128 and/or the user data 130 can be stored in a table, database, or other data structure that can support querying and/or other lookup operations or other operations. As such, the object library 128 and/or the user data 130 can be searched according to various aspects of the object library 128 and/or the user data 130, and the acoustic representation service 124 can determine how to represent objects, paths, and/or whether or how to present alerts to users or user devices based upon the input data 122 and/or the object library 128 and/or the user data 130. The acoustic representation service 124 also can be configured to store the object library 128 and/or the user data 130 at the data store 132 or other data storage device, though this is not necessarily the case.

According to various embodiments, the acoustic representation service 124 can obtain a request to provide an acoustic representation 118 or a request to provide acoustic representation data 134. As explained above, the request can include an explicit or implicit request and can be triggered by various actions by users such as, for example, selection of an option to obtain the acoustic representation 118 or acoustic representation data 134, or by activities at a user device 102 such as activation of an acoustic representation application 108, transmission of input data 122 to the acoustic representation service 124, or the like.

The acoustic representation service 124 can receive the input data 122. As noted above, the input data 122 can correspond to one or more instances and/or streams of data such as video data, audio data, sensor reading data, traffic information, weather information, location information, requests, combinations thereof, or the like. The acoustic representation services 124 can recognize the input data 122 as a request for acoustic representation data 134. As noted above, the request can include explicit and/or implicit requests.

The acoustic representation service 124 can analyze the input data 122 and determine, based upon the input data 122, a user or user device 102 associated with the input data 122. The acoustic representation service 124 can access the user data 130 to determine what information is to be recognized, generated, and/or provided based upon the input data 122. Additionally, the acoustic representation service 124 can perform authentication functions, if desired. In some embodiments, the authentication can be included for various reasons including, but not limited to, verifying user or device identity prior to providing data that may be charged for using various charging arrangements. The user data 130 also can include preferences, configurations, settings, options, or the like, and also can provide association information that may be used to access an object library 128 and/or portion of the object library 128 that is relevant to the user or user device 102. It should be understood that this example is illustrative and therefore should not be construed as being limiting in any way.

The acoustic representation service 124 can analyze the input data 122, the object library 128, and/or the user data 130 to recognize objects in a proximity of the user device 102, to recognize object paths, to generate alerts and/or warnings, to generate the acoustic representation data 134 for use in generating the acoustic representation 118, combinations thereof, or the like. The acoustic representation service 124 can identify the relevant data and determine if any alerts are to be provided. The alerts can be provided immediately, in some embodiments, while the acoustic representation service 124 can perform other functions associated with providing acoustic representations. Thus, for example, if the acoustic representation service 124 recognizes a threat, obstacle, or other event or object relating to the user associated with the user device 102, the acoustic representation service 124 can generate a warning or alert, provide the warning or alert to the user device 102, and then can continue preparing the acoustic representation data 134. It should be understood that this example is illustrative and therefore should not be construed as being limiting in any way.

In various embodiments, the acoustic representation service 124 can provide the acoustic representation data 134 to the user device 102. The acoustic representation service 124 can be configured to stream the acoustic representation data 134 to the user device 102 and/or to provide the acoustic representation data 134 to the user device 102 repeatedly. It should be understood that this example is illustrative and therefore should not be construed as being limiting in any way.

The user device 102 can receive the acoustic representation data 134. The user device 102 can be configured to analyze the acoustic representation data 134 and generate an acoustic representation 118 based upon the acoustic representation data 134. The analysis can include, for example, translating data included in the acoustic representation data 134 into an acoustic representation 118. Thus, for example, if the acoustic representation data 134 indicates that an object is moving into a path associated with the user device 102, the user device 102 can, via execution of the acoustic representation application 108, generate an acoustic representation of that information such as an audio representation, a verbal indication, haptic feedback, combinations thereof, or the like. These and other aspects of the acoustic representation application 108 will be further understood below. It should be understood that in some embodiments, the acoustic representation application 108 does not perform any translation or similar functionality, and that instead, the acoustic representation data 134 can be in a format that can be used to generate the acoustic representation 118 without further analysis and/or processing. It should be understood that this example is illustrative and therefore should not be construed as being limiting in any way.

The acoustic representation 118 can be passed to the acoustic representation hardware 114 for providing to the user. According to various embodiments, the acoustic representation hardware 114 can include audio devices, haptic devices, display devices, combinations thereof, or the like. In some embodiments, the acoustic representation hardware 114 can include bone-conducting headphones, which can provide audio signals via speakers and/or via bone conduction. Thus, for example, the acoustic representation 118 can be output on one or more speakers, one or more displays, one or more vibration devices, one or more pressure devices, one or more bone conduction devices, other devices, combinations thereof, or the like.

In some contemplated embodiments, wherein the acoustic representation 118 is output as audio, the acoustic representation hardware can include headphones, earphones, earbuds, or other hearing or listening devices. In some contemplated embodiments, over the ear headphones or off the ear headphones can be used. The headphones can include multiple speakers for each side of the head, whereby a surround sound or three-dimensional effect can be applied to the audio. Thus, a listener can, based upon "movement" of the audio between the four or more speakers, generate a spatial understanding of where objects are and/or a relative or absolute range associated with the objects. It should be understood that this example is illustrative and therefore should not be construed as being limiting in any way.

In some embodiments, a high-pitched note can represent a particular threat, obstacle, object, or the like, and a relatively-lower-pitched note can represent a different threat, obstacle, object, or the like, though this is not necessarily the case. In one specific embodiment, a high-pitched note at about three hundred thirty hertz (corresponding to approximately E4) can be used to represent a vehicle, and a low-pitched note at about eighty two hertz (corresponding approximately to E2) can be used to represent an unidentified object. It should be understood that this example is illustrative and therefore should not be construed as being limiting in any way.

In some embodiments, notes or other audio signals can be pulsed to denote distance of the object. In one example, the breaks between notes can be shortened as the distance between the user device 102 and the object is shortened or reduced. In some embodiments, wherein pulsing notes are used to denote distance, when the object is within a particular distance (ten feet, five feet, three feet, one foot, six inches, or the like), the note can be changed to a solid (no pulses) note without any breaks. The distance at which the note is switched from pulsed to solid can be set based upon the type of object, an expected reaction time needed to react to and/or avoid the threat or object, as well as other considerations. Thus, for example, a car may have a particular associated distance threshold such as twenty feet at which point the note corresponding to the car can be switched to solid, while an unidentified stationary object can have a relatively small distance threshold of five feet, or the like at which an associated note can be switched from pulsed to solid. It should be understood that this example is illustrative and therefore should not be construed as being limiting in any way.

In some embodiments, pitch changes can be used to denote distance of objects from a user or the user device 102. In particular, in some embodiments, objects that are relatively far away from a user device 102 may be denoted by a low-pitched note, signal, tune, or other audio representation. As the object moves closer to the user device 102, or as the user device 102 is moved closer to the object, the pitch associated with the object can be changed to a relatively higher-pitched note. Alternatively, objects that are relatively far away from a user device 102 may be denoted by a high-pitched note. As the object moves closer to the user device 102, or as the user device 102 is moved closer to the object, the pitch associated with the object can be changed to a relatively lower-pitched note. It should be understood that this example is illustrative and therefore should not be construed as being limiting in any way.

In some embodiments, sound intensity can be used to denote distance of objects from a user or the user device 102. In particular, in some embodiments, objects that are relatively far away from a user device 102 may be denoted by a low-volume note, tune, signal, or other audio representation. As the object moves closer to the user device 102, or as the user device 102 is moved closer to the object, the volume of the audio representation associated with the object can be increased to a relatively higher volume audio representation. Alternatively, objects that are relatively far away from a user device 102 may be denoted by a high-volume audio representation. As the object moves closer to the user device 102, or as the user device 102 is moved closer to the object, the volume associated with the object can be changed to a relatively lower-volume audio representation. It should be understood that this example is illustrative and therefore should not be construed as being limiting in any way.

Also, some embodiments of the concepts and technologies described herein can use other audio effects to denote distance and/or to otherwise illustrate or represent possible threats associated with objects in the acoustic representations 118. For example, in some embodiments progressive intensity of frequency-modulating signals can be applied to notes, tunes, signals, or other audio representations of objects to indicate a threat and/or proximity to the user or user device 102. Similarly, progressive intensity of ring-modulating signals can be applied to notes, tunes, signals, or other audio representations of objects to indicate a threat and/or proximity to the user or user device 102. Because other audio effects can be applied to denote threats, proximity, and/or other aspects of objects and/or their associated paths of movement, it should be understood that these examples are illustrative and therefore should not be construed as being limiting in any way.

Similarly, some embodiments of the concepts and technologies described herein can represent movement of objects using audio effects. For example, as an object passes in front of a user or behind a user (and thereby moves from the user's left to right or right to left), a note, signal, tune, or other audio representation of the object can be "moved" in the acoustic representation 118 by using phase shifting to, for example, move the audio representation of the object from a left ear to a right ear, from a right ear to a left ear, from front to back, from back to front, combinations thereof, or the like. It should be understood that this example is illustrative and therefore should not be construed as being limiting in any way.

In some embodiments of the concepts and technologies described herein, the acoustic representation 118 can include earcons, which can be modulated depending upon various conditions such as distance, location, relative location, bearing, relative bearing, or the like. Similarly, some embodiments of the acoustic representation 118 can include vibracons. Vibracons also can be modulated based upon various conditions such as distance, location, relative location, bearing, relative bearing, or the like. It should be understood that this example is illustrative and therefore should not be construed as being limiting in any way.

As noted above, the acoustic representation 118 also can include visual displays such as text displays, which can be altered dynamically based upon conditions. For example, the size, color, and/or orientation of the text display can be dynamically changed based upon location of a threat or obstacle, relative location of the threat or obstacle, distance from the threat or obstacle, a bearing or relative bearing of the threat or obstacle, combinations thereof, or the like.

Similarly, a simplified visual display may be used to represent threats. Such visual displays may be particularly useful for users with some cognitive disabilities, as well as some users in military or security roles. It should be understood that these examples are illustrative and therefore should not be construed as being limiting in any way.

In some embodiments, the notes and pulsing described hereinabove are not used. In some embodiments, spoken commands, instructions, or information can be used in addition to, or instead of, the notes and pulsing described above. Thus, for example, the acoustic representation 118 can include an audible information alert such as, for example, "a vehicle is approaching your path about twenty feet ahead—please stop." It should be understood that this example is illustrative and therefore should not be construed as being limiting in any way.

The acoustic representation 118 can be provided to a user or other entity via the acoustic representation hardware 114 to help the user or other entity avoid threats or obstacles and/or for other purposes. In some embodiments, the concepts and technologies described herein can be used to provide motion and/or object tracking. Thus, for example, embodiments of the concepts and technologies described herein can be used to help a user feed himself, get dressed, navigate to a destination, perform other activities, combinations thereof, or the like. In particular, the acoustic representation 118 can include spoken directions to help a user navigate to a destination. Thus, for example, the acoustic representation 118 can include directions such as, for example, "turn left and continue for about five hundred feet." It should be understood that this example is illustrative and therefore should not be construed as being limiting in any way.

The acoustic representation 118 also can include haptic or audio feedback for motion or object tracking. Thus, for example, embodiments of the concepts and technologies described herein can be used to help a user feed himself or do other tasks that may be difficult for certain users with severe cognitive disabilities and/or other impairments or disabilities without the availability of an embodiment of the concepts and technologies described herein. The motion tracking can be used, for example, to help users with various disabilities or impairments find various articles such as, for example, shoes, clothing, bags, or the like; to track an eating utensil and/or its relationship to the user's mouth; for other purposes, or the like. Haptic feedback also can be used to help guide an eating utensil, for example, by providing feedback as the hand or eating utensil is moved. As noted above, some users with severe cognitive disabilities and/or with some sensory impairments may benefit from these or other embodiments disclosed herein. It should be understood that this example is illustrative and therefore should not be construed as being limiting in any way.

The concepts and technologies described herein also can be used to build object libraries 128 and to provide an object locator function, in some embodiments. Thus, for example, a user or other entity can build an object library 128 of personal effects, objects, or the like, that the user or other entity may wish to locate and/or track. The object library 128 can be user-specific, location-specific, account-specific, specific to a particular user device 102, combinations thereof, or the like. In some other embodiments, the object library 128 may be used to store objects for more than one user, and the user data 130 can be used to associate particular objects with users, devices, accounts, locations, or the like. Thus, the acoustic representation service 124 can use various users' input to build extensive libraries of objects, and the like. It should be understood that this example is illustrative and therefore should not be construed as being limiting in any way.

The object library 128 can be used to find objects, to track objects, or the like. In one contemplated example, a user or other entity may enter a text, spoken, or other command to find a particular object. The acoustic representation service 124 can receive the request and access the object library 128 and/or the user data 130. The acoustic representation service 124 also can obtain captured data such as, for example, the input data 122 described hereinabove. The acoustic representation service 124 can analyze the input data 122 and determine if the object identified in the request is recognized in a proximity of the user or user device 102. If the object is recognized, the acoustic representation service 124 can generate acoustic representation data 134 that identifies a location of the object. In some embodiments, the acoustic representation 118 can include an indication that object is found, and distance and/or direction information to assist a user in locating the object, or other information. It should be understood that this example is illustrative and therefore should not be construed as being limiting in any way.

According to various embodiments, as will be explained in more detail below, the acoustic representation application 108 also can be configured to provide the user device 102 with device-side processing capabilities. In particular, because the captured data 116 can pass through and/or be analyzed by the user device 102, the user device 102 can, via execution of the acoustic representation application 108, identify some threats, objects, obstacles, or the like at the user device 102 without first forwarding the captured data 116 to other entities, for example as the input data 122. The user device 102 also can, via execution of the acoustic representation application 108, provide device-side processing on the captured data 116 such as, for example, adjusting or setting frame rates of captured of captured video, adjusting audio quality of captured audio, adjusting intervals between determining and/or providing location data, combinations thereof, or the like. Thus, device-side processing can be used to reduce network utilization, bandwidth consumption, or the like; to reduce latency and/or network congestion; combinations thereof; or the like.

More particularly, if the user device 102 determines, based upon device-side processing of the captured data 116, that there are no immediate threats or obstacles, or that objects are stationary, far away, and/or do not require streaming data to monitor, the user device 102 can adjust a frame rate of captured video, adjust a quality of captured audio, combinations thereof, or the like. Thus, user device 102 can improve performance of the acoustic representation service 124, in some embodiments, where such functionality is available and/or activated. It should be understood that this example is illustrative and therefore should not be construed as being limiting in any way.

FIG. 1 illustrates one user device 102, one network 104, one instance of the accessories 110, one server computer 126, and one data store 132. It should be understood, however, that various implementations of the operating environment 100 include zero, one, or more than one user device 102, zero, one, or more than one network 104, zero, one, or more than one instance of the accessories 110, zero, one, or more than one server computer 126, and zero, one, or more than one data store 132. As such, the illustrated embodiment should be understood as being illustrative, and should not be construed as being limiting in any way.

Figure 2:
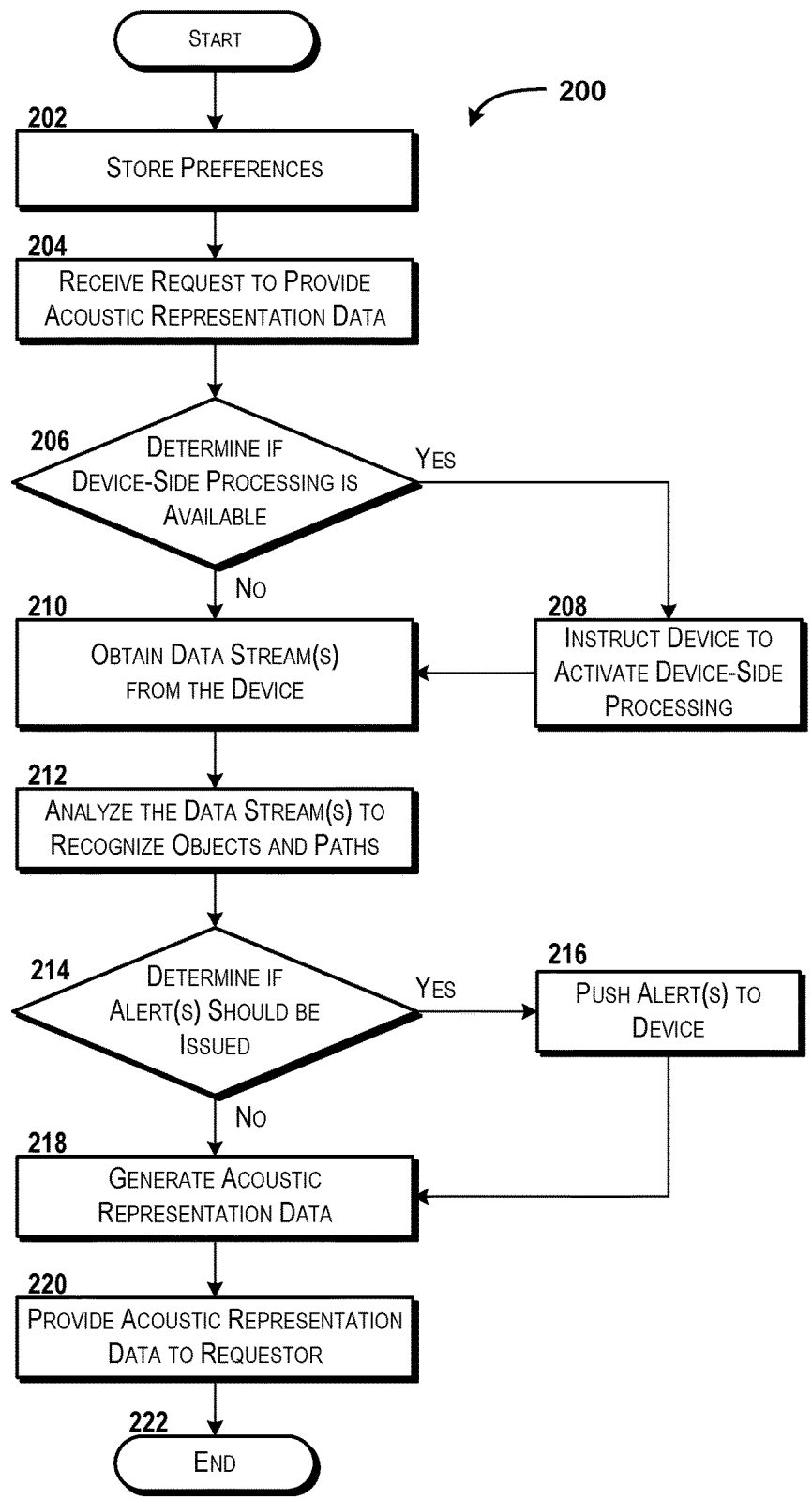
FIG. 2 is a flow diagram showing aspects of a method for providing acoustic representation data to a device using an acoustic representation service, according to an illustrative embodiment.

Turning now to FIG. 2, aspects of a method 200 for providing acoustic representation data 134 to a device using an acoustic representation service 124 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, server computer 126 to perform one or more operations and/or causing the processor to direct other components of the computing system or device to perform one or more of the operations.

For purposes of illustrating and describing the concepts of the present disclosure, the methods disclosed herein are described as being performed by the server computer 126 via execution of one or more software modules such as, for example, the acoustic representation service 124. It should be understood that additional and/or alternative devices and/or network nodes can provide the functionality described herein via execution of one or more modules, applications, and/or other software including, but not limited to, the acoustic representation service 124. Thus, the illustrated embodiments are illustrative, and should not be viewed as being limiting in any way.

The method 200 begins at operation 202. At operation 202, the server computer 126 stores preferences 120. The preferences 120 can be associated with a particular user, user device (such as the user device 102), account, profile, location, or the like. In some embodiments, a user or other entity can configure the preferences 120 by interacting with the acoustic representation service 124 using a web portal; an options, settings, or configurations setup process; interactions controlled by the acoustic representation application 108; other interactions or processes; combinations thereof; or the like.

When setting up and/or obtaining the preferences 120, the server computer 126 can store various preferences, settings, options, configurations, combinations thereof, or the like. Furthermore, the server computer 126 can store the preferences 120 and associate the stored preferences 120 with one or more users, one or more accounts, one or more geographic locations, one or more user devices 102, combinations thereof, or the like. According to various embodiments, the server computer 126 can store the preferences 120 and/or other information as the user data 130. It should be understood that this example is illustrative and therefore should not be construed as being limiting in any way.

From operation 202, the method 200 proceeds to operation 204. At operation 204, the server computer 126 can receive a request to provide acoustic representation data 134. The request received in operation 204 can include a request associated with a particular device and/or user. For purposes of illustrating and describing the concepts and technologies described herein, the request received in operation 204 will be described as being received from the user device 102 shown in FIG. 1. Thus, the request can be provided with or as the input data 122, though this is not necessarily the case. In some embodiments, the user device 102 can generate an explicit request for acoustic representation data 134.

In some other embodiments, activation of the acoustic representation application 108 at the user device 102 and/or providing or streaming the input data 122 to the acoustic representation service 124 can correspond to an implicit request for the acoustic representation data 134. Because the acoustic representation data 134 can be requested in additional and/or alternative ways, it should be understood that these examples are illustrative and therefore should not be construed as being limiting in any way.

From operation 204, the method 200 proceeds to operation 206. At operation 206, the server computer 126 determines if device-side processing is available. In some embodiments, the server computer 126 can determine that device-side processing is available or unavailable by accessing the user data 130, by interrogating the user device 102, and/or by other processes. As noted above, the device-side processing can be used to determine an audio and/or video capture rate and/or quality, to adjust intervals between updates, combinations thereof, or the like. Thus, the device-side processing can be used to improve performance of the acoustic representation service 124 and/or the user device 102. It should be understood that this example is illustrative and therefore should not be construed as being limiting in any way.

If the server computer 126 determines, in operation 206, that device-side processing is available, the method 200 can proceed to operation 208. At operation 208, the server computer 126 can instruct a device (such as the user device 102) to activate device-side processing. As explained above, device-side processing can be used to analyze the captured data 116, location information, sensor readings, or the like to determine if any adjustments are to be made to captured video quality, captured audio quality, video frame rates, intervals between updates, combinations thereof, or the like.

If the server computer 126 determines, in operation 206, that device-side processing is not available, the method 200 proceeds to operation 210. The method 200 also can proceed to operation 210 from operation 208. At operation 210, the server computer 126 can obtain input data 122 from the user device 102. As explained above with reference to FIG. 1, the input data 122 can include the captured data 116 and/or other data and/or data streams such as, for example, audio input such as streaming and/or non-streaming audio; video input such as streaming and/or non-streaming video; imaging input such as photographs or other images; orientation information such as accelerometer, gyroscope, and magnetometer output; location information such as GPS coordinates, network location information, or the like; movement information such as movement vectors, movement paths, and/or bearing information; combinations thereof; or the like.

As noted above, the input data 122 can include data captured by the collection hardware 112, the user device 102, and/or other sources. Thus, the input data 122 can be obtained from devices, systems, and/or networks local to the user device 102 and/or the collection hardware 112, from devices, systems, and/or networks remote from the user device 102 and/or the collection hardware 112, and/or from other devices, systems, and/or networks. While the embodiment illustrated and described above with reference to FIG. 1 shows the input data 122 being obtained by the server computer 126 from the user device 102, it should be understood that the input data 122 additionally and/or alternatively can be obtained from multiple devices, systems, nodes, or the like. In one contemplated embodiment, one or more instances of input data 122 can be obtained from the user device 102, and one or more instances can also be obtained from other devices or systems such as traffic light systems, crosswalk systems, traffic systems, location servers, closed-circuit television recording devices, video systems, combinations thereof, or the like.

From operation 210, the method 200 proceeds to operation 212. At operation 212, the server computer 126 can analyze the input data 122 to recognize objects and paths (associated with the objects). According to various embodiments, the server computer 126 can analyze video included in the input data 122 to identify objects. The server computer 126 can also use the object library 128 to identify the objects in the input data 122. In the case of video, the server computer 126 can be configured to compare frames of the video to recognize the objects and/or their associated paths. For example, the server computer 126 can recognize a vehicle in a first frame of the video and in a second frame of the video. By comparing the relative position of the vehicle, a relative scale of the vehicle, and/or other changes between the two frames, as well as movement associated with the user device 102, the server computer 126 can determine a path of the vehicle. It should be understood that this example is illustrative and therefore should not be construed as being limiting in any way.

According to various embodiments, the analysis illustrated and described herein with reference to operation 212 can be performed by a core network of a communications network and therefore can take advantage of immense amounts of low-latency computing power and computing bandwidth. Thus, the operation 212 can include identifying numerous objects and their associated paths. Some objects can be determined, by the server computer 126, not to warrant tracking due to not posing any threat to a user of the user device 102. As such, operation 212 also can include identifying objects that will not trigger feedback to a user or other entity associated with the user device 102. In operation 212, the server computer 126 can effectively build a representation of the environment around the user device 102, objects located in the environment, movement of the user device 102 within the environment, and/or paths associated with the objects. It should be understood that this example is illustrative and therefore should not be construed as being limiting in any way.

From operation 212, the method 200 proceeds to operation 214. At operation 212, the server computer 126 can determine if one or more alerts should be issued to the user device 102. The server computer 126 can determine that an alert should be issued, for example, if the server computer 126 recognizes an object and/or associated path in operation 212 that may pose a threat or obstacle to a user or other entity associated with the user device 102. For example, if the server computer 126 determines that an object's path and a path of the user device 102 likely will intersect, the server computer 126 can identity that object as posing a threat to the user. In some embodiments, the alert can be provided immediately (before generating the acoustic representation data 134) to prevent delay of a potentially helpful alert.

In one example, the server computer 126 may recognize that an object is in the path of the user, and is within a particular distance or time threshold from posing a threat or obstacle to the user. Thus, the server computer 126 can provide an alert in informing the user or other entity about the object. In one example, an open manhole cover may be recognized in the path of the user device 102. Thus, an alert can be generated to inform the user before the user encounters the open manhole cover. Because numerous types of threats and/or obstacles can be identified and/or can prompt delivery of an alert, it should be understood that this example is illustrative and therefore should not be construed as being limiting in any way.

If the server computer 126 determines, in operation 214, that one or more alerts should be issued to the user device 102, the method 200 proceeds to operation 216. At operation 216, the server computer 126 can push one or more alerts to the user device 102. While the illustrated embodiment of the method 200 mentions "pushing" the alert to the user device 102, it should be understood that the alert can be provided to the user device 102 in additional and/or alternative ways without using a network "push" per se. In particular, the alert can be transmitted to the user device 102, made available as a download to the user device 102, passed to the user device 102 via a special purpose message or signaling protocol message, broadcast to the user device 102 using a broadcast channel, transmitted or made available via other communications channels, combinations thereof, or the like. If the server computer 126 determines, in operation 214, that one or more alerts should not be issued to the user device 102, the method 200 proceeds to operation 218. The method 200 also can proceed to operation 218 from operation 216.

At operation 218, the server computer 126 can generate acoustic representation data 134. As explained in detail above, the server computer 126 can determine an environment associated with the user device 102, a relative position of the user device 102 within the environment, objects within the environment, and/or paths associated with the objects within the environment in operation 212. Thus, operation 218 can correspond to the server computer 126 generating data that represents the information determined in operation 212 in a format that can be used and/or recognized by the user device 102 to generate the acoustic representation 118. In various embodiments, the server computer 126 generates the acoustic representation data 134 in operation 218. It should be understood that this example is illustrative and therefore should not be construed as being limiting in any way.

From operation 218, the method 200 proceeds to operation 220. At operation 220, the server computer 126 can provide the acoustic representation data 134 generated in operation 218 to the user device 102. In various embodiments, the server computer 126 can perform the operations 210-220 one time, while in various other embodiments, the functionality of the server computer 126 described herein with reference to operations 210-220 can be performed repeatedly. In particular, in some embodiments the server computer 126 can stream subsequent instances of the acoustic representation data 134 to the user device 102 so the user device 102 can generate and provide an acoustic representation 118 to a user or other entity in a streaming manner or a substantially continuous manner. It should be understood that this example is illustrative and therefore should not be construed as being limiting in any way.

From operation 220, the method 200 proceeds to operation 222. The method 200 ends at operation 222.

Figure 3:
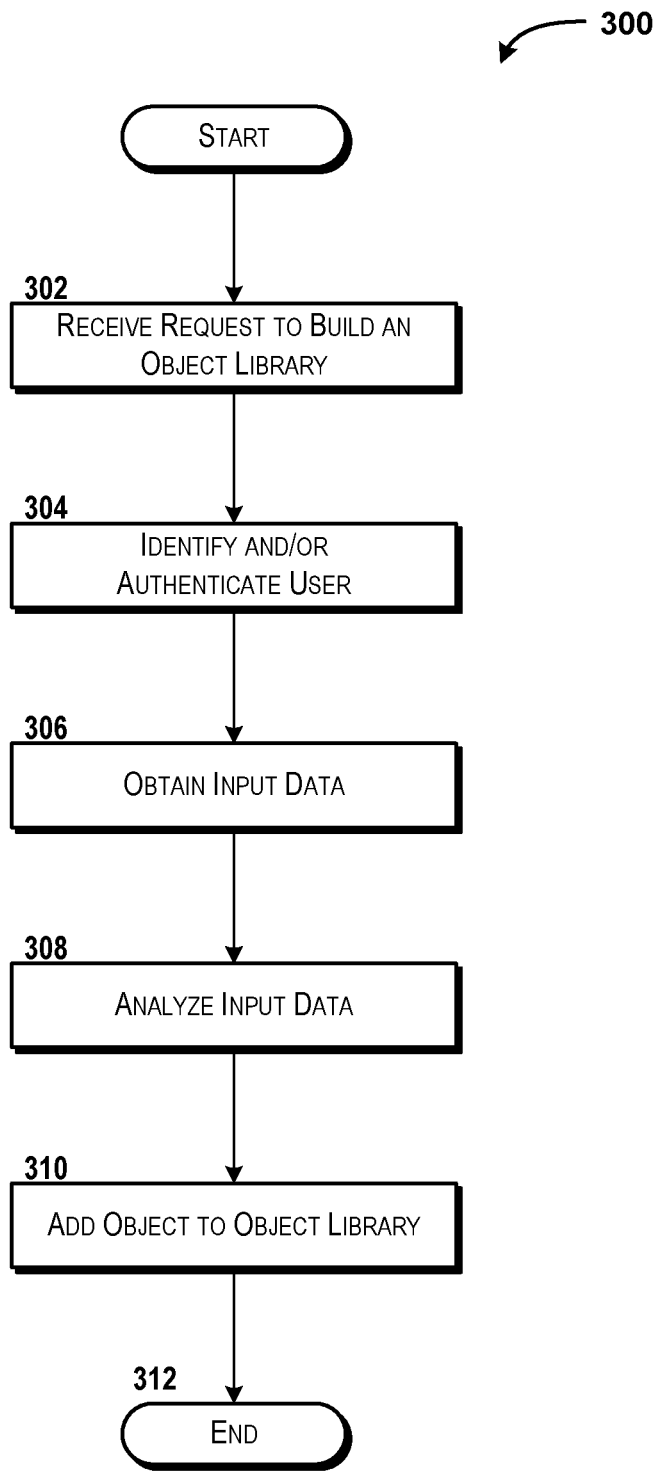
FIG. 3 is a flow diagram showing aspects of a method for building an object library using an acoustic representation service, according to another illustrative embodiment.

Turning now to FIG. 3, aspects of a method 300 for building an object library 128 using an acoustic representation service 124 will be described in detail, according to an illustrative embodiment. The method 300 begins at operation 302. At operation 302, the server computer 126 can receive a request to build an object library 128. The object library 128 can be associated with a particular user, a particular user device 102, a particular account, a particular geographic location, a particular address, combinations thereof, or the like. As explained above, the object library 128 can be specific to a particular user, user device 102, account, location, or the like. In some other embodiments, the object library 128 can include objects for multiple users, and the user data 130 can be used to associate specific objects in the object library 128 with particular users, user devices 102, accounts, locations, or the like.

In some embodiments, the request to create the object library 128 can be an explicit or implicit request. The request can be received via selection or entry of a command to build the object library 128, for example. In some other embodiments, the request to build the object library 128 can be prompted during a setup or first activation process and therefore may not be prompted by a user action or command unless a user specifically elects to rebuild the object library 128 and/or to supplement or modify an existing object library 128. Because the functionality illustrated and described herein for building an object library 128 can be provided at various times and/or in response to various actions or events, it should be understood that these examples are illustrative and therefore should not be construed as being limiting in any way.

From operation 302, the method 300 proceeds to operation 304. At operation 304, the server computer 126 can identify and/or authenticate a user associated with the request received in operation 302. The authentication can be used to identify a user and/or to provide authentication for various purposes. In some embodiments, the user's identity may be known without authentication, and as such the authentication can be used for other purposes such as ensuring that a user is authorized to use a paid service, or the like. In some other embodiments, the authentication may not be performed, and the user's identity can be determined in operation 304 without authentication.

In some embodiments in which authentication is used, the authentication can be based upon a username and/or a password, or other information; device data such as device serial numbers, international mobile subscriber identities ("IMSIs"), or international mobile equipment identities ("IMEIs"); or other data such as biometric information such as voice recognition, retinal scan, fingerprint scan, facial recognition, or the like; and/or other information. Because authentication generally is understood, the various types and/or approaches for providing single-factor and/or multi-factor authentication will not be further described herein, but are included within the scope of the authentication illustrated and described herein.

From operation 304, the method 300 proceeds to operation 306. At operation 306, the server computer 126 can obtain input data 122. The input data 122 received in operation 306 can include captured data 116 such as images, video, audio, sensor readings, location information, orientation information, movement information, combinations thereof, or the like. As noted above, the input data 122 can include data captured from the user device 102, the accessories 110, the collection hardware 112, and/or other systems, devices, networks, nodes, or the like.

In some embodiments, the input data 122 can include a spoken, typed, selected, or otherwise entered tag or label for an item or object included in the input data 122. Thus, for example, a user may take a photograph or video of a coffee mug, hat, wireless device, or other object, and identity the object as, for example, "my coffee mug," "my favorite hat," "my wife's cell phone," or the like. Thus, the input data 122 can include not only a representation of an object being added to the object library 128, but also a tag that should be used to identify the object. It should be understood that this example is illustrative and therefore should not be construed as being limiting in any way.

From operation 306, the method 300 proceeds to operation 308. At operation 308, the server computer 126 can analyze the input data 122 obtained in operation 306. As explained above, the analysis can include object recognition, though this is not necessarily the case. In the example above of a hat, the server computer 126 can be configured to recognize a hat in the input data 122, but based upon the tag or label, the object identified in operation 308 can be further defined by the server computer 126 to distinguish the object from similar objects. Thus, for example, if an object library 128 includes a hat and the input data 122 also includes a hat, the label or tag for the hat represented in or by the input data 122 can be used to distinguish this hat from other hats. Color, size, printed information, combinations thereof, or the like can be used to distinguish this hat, the user's "favorite hat" from other hats. It should be understood that this example is illustrative and therefore should not be construed as being limiting in any way.

In some embodiments, the server computer 126 can interrogate a user or other entity associated with the user device 102 to identify and/or represent distinguishing characteristics of object, though this is not necessarily the case. In particular, in some embodiments, the server computer 126 can ask a user or other entity for additional information and/or tags or labels for some objects. For example, if the server computer 126 cannot distinguish the object from objects in the object library 128 without additional information, the server computer 126 can be configured to exchange messages with a user or other entity to obtain further identifying and/or distinguishing information associated with the object. In the case of a hat, for example, the information can include text written on the hat, color information, patterns, combinations thereof, or the like. It should be understood that this example is illustrative and therefore should not be construed as being limiting in any way.

From operation 308, the method 300 proceeds to operation 310. At operation 310, the server computer 126 can add the object to the object library 128. According to various embodiments, the server computer 126 can add data to an object library 128 that identifies the object. The server computer 126 also can add information to the user data 130 that associates the object with a particular user, user device 102, account, location, or the like. The object library 128 can store data such as images, labels, tags, object identifiers, combinations thereof, or the like. Thus, in operation 310, the server computer 126 can generate data in the object library 128 and/or the user data 130 that can be used to find and/or recognize the object if requested. It should be understood that this example is illustrative and therefore should not be construed as being limiting in any way.

From operation 310, the method 300 proceeds to operation 312. The method 300 ends at operation 312.

Figure 4:
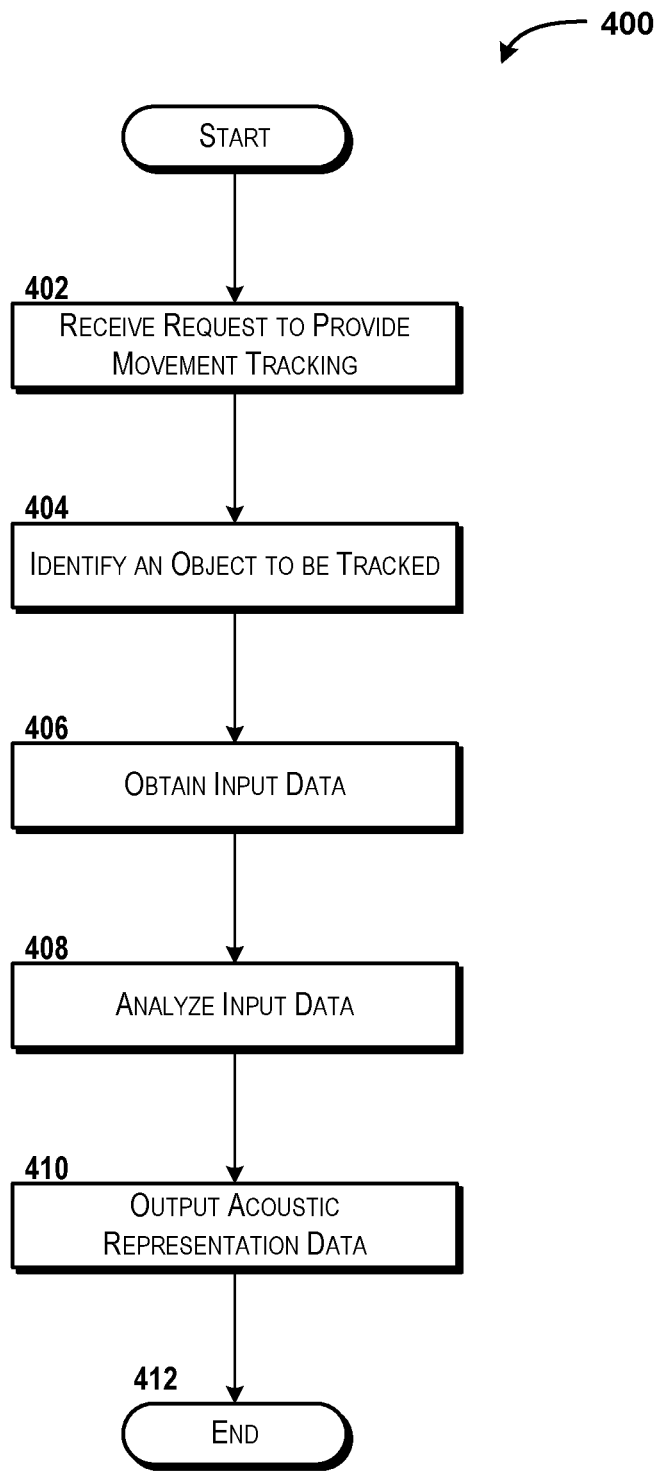
FIG. 4 is a flow diagram showing aspects of a method for providing movement tracking and feedback using an acoustic representation service, according to another illustrative embodiment.

Turning now to FIG. 4, aspects of a method 400 for providing movement tracking and feedback using an acoustic representation service will be described in detail, according to an illustrative embodiment. The method 400 begins at operation 402. At operation 402, the server computer 126 can receive a request to provide movement tracking. The request can include an explicit request from a user. In one contemplated example, a user with severe cognitive disabilities or some other impairments can issue a command to "help me put my shoes on," for example. In another example, a user who is blind or who has low vision can issue a command to navigate to a particular location, to scan an environment (such as a street or sidewalk) for obstacles in the user's path. In some other embodiments, the request can be implicitly generated, for example, by starting or activating an application that tracks particular body parts, objects, or the like, which may be used by users with severe cognitive disabilities, for example. Regardless of how the request is generated, the server computer 126 can determine that a particular object or item is to be tracked in operation 402.

From operation 402, the method 400 proceeds to operation 404. At operation 404, the server computer 126 can identify an object or item to be tracked. In some embodiments, the server computer 126 can identify the object to be tracked based upon an explicit or implicit request, based upon user input, or the like. For example, a user with severe cognitive disabilities may enter a command such as "please help me put my shoes on," and in response to this command, the server computer 126 can determine that the object to be tracked includes the shoes, feet of the user, and hands of the user. In another example, a user who is blind or who has low vision may issue a command to scan an environment such as the user's home for a particular object (e.g., my red shirt), a street corner for obstacles, a store for a particular object or product, combinations thereof, or the like. Thus, the server computer 126 can identify the object (or objects) to be tracked based upon context and/or user input and/or a combination thereof. Because the object (or objects) to be tracked can be identified in additional and/or alternative ways, it should be understood that these examples are illustrative and therefore should not be construed as being limiting in any way.

From operation 404, the method 400 proceeds to operation 406. At operation 406, the server computer 126 can obtain input data 122. As explained above, the input data 122 can include the captured data 116 and/or other data and/or data streams such as, for example, streaming and/or non-streaming audio; streaming and/or non-streaming video; imaging data such as photographs or other images; sensor readings such as accelerometer, gyroscope, and magnetometer output; movement information; combinations thereof; or the like. As noted above, the input data 122 can include data captured by the collection hardware 112, the user device 102, and/or other sources. The input data 122 can be obtained from devices, systems, and/or networks local to or remote from the user device 102 and/or the collection hardware 112 and/or from other devices, systems, and/or networks.

From operation 406, the method 400 proceeds to operation 408. At operation 408, the server computer 126 can analyze the input data 122 received in operation 406. As explained above with reference to operations 212 and 308 of FIGS. 2 and 3, respectively, the analysis can be performed to identify objects and/or their associated movements. Thus, operation 408 can include object recognition and motion tracking.

It should be understood that according to various embodiments of the concepts and technologies described herein, including the operations 212 and 308 illustrated and described above, the server computer 126 can be configured to track multiple objects or targets and/or their associated paths of movement simultaneously. As such, it can be appreciated that the server computer 126 can be used in complex environments to detect threats and/or obstacles and/or to provide output relating to these multiple threats and/or obstacles. For example, a user at a busy intersection may be threatened by multiple obstacles and/or threats at a particular moment such as an approaching car, an obstacle in his or her path, an approaching bicycle, and/or the like. According to various embodiments of the concepts and technologies described herein, the server computer 126 can recognize these and other obstacles simultaneously and provide output to the user to indicate these multiple threats. As noted above, the threats can be prioritized, in some embodiments. It should be understood that this example is illustrative and therefore should not be construed as being limiting in any way, though in operation 408, the server computer 126 may effectively be tasked, via operation 404, with tracking one or more than one particular object.

From operation 408, the method 400 proceeds to operation 410. At operation 410, the server computer 126 can output acoustic representation data 134. The acoustic representation data 134 can represent the movement of the object identified in operation 404. As noted above, while the acoustic representation data 134 is illustrated and described herein primarily as audible output, it also should be understood that the server computer 126 can output haptic feedback as well. Thus, for example, the acoustic representation data 134 can include vibration or other haptic output that instructs or informs a user where an object is and/or its movement. Because the acoustic representation data 134 can include various types of output, it should be understood that this example is illustrative and therefore should not be construed as being limiting in any way.

From operation 410, the method 400 proceeds to operation 412. The method 400 ends at operation 412.

As explained above, the input data 122 illustrated and described herein can include captured data 116, and as such, the input data 122 can represent one or more objects and/or paths of movement associated with the one or more objects. Thus, in some embodiments the input data 122 can represent a single object, for example, a photograph of an object being used to build an object library 128. In some other embodiments, the input data 122 can represent multiple objects, for example, a video of a street, in which multiple objects may be located and in which these multiple objects can have multiple paths. Thus, an object can be represented "by" the input data 122, for example by the input data 122 representing a single object. Alternatively, an object can be represented "in" the input data 122, for example in a video feed and/or other data in which multiple objects may be included and/or represented. Notwithstanding the above explanation, it should be noted that the word "by" is used in the claims to refer to either (or both) of the above representation of a data "by" the input data 122. Thus, in the claims, an object represented "by" the input data includes both of the above, namely, a single object represented by the input data 122 and/or where the input data 122 includes representations of multiple objects.

According to various embodiments of the concepts and technologies described herein, the acoustic representation service 124 can support personalization in addition to, or instead of, building object libraries 128. For example, via interactions with the acoustic representation service 124, users or other entities can identify various items specific to a user, location, account, device, or the like, and the acoustic representation service 124 can store information that can be used to recognize the objects. For example, a user or other entity can create, via the input data 122 or other interactions with the acoustic representation service 124, recognition of "my favorite hat," "my red shoes," or the like, which the acoustic representation service 124 can associate with the custom labels, or the like, as explained in detail above with reference to building an object library 128.

Additionally, or alternatively, users or other entities can create custom labels for locations. For example, a user or other entity can train the acoustic representation service 124 to associate a tag or label such as "my home," "my office," "the doctor," or the like, with a particular geographic location and/or with a particular pattern, object, or other visual representation that can be captured or represented by the input data 122. Thus, for example, captured data 116 included in the input data 122 can be understood by the acoustic representation service 124 as corresponding to a particular location and, based upon recognition of the captured data 116, recognize the location of the user or other entity. Thus, for example, the acoustic representation service 124 can provide output to a user or other entity when the user or other entity is near a particular location, walking or otherwise moving toward or away from a particular location, or the like. It should be understood that these examples are illustrative and therefore should not be construed as being limiting in any way.

Figure 5:
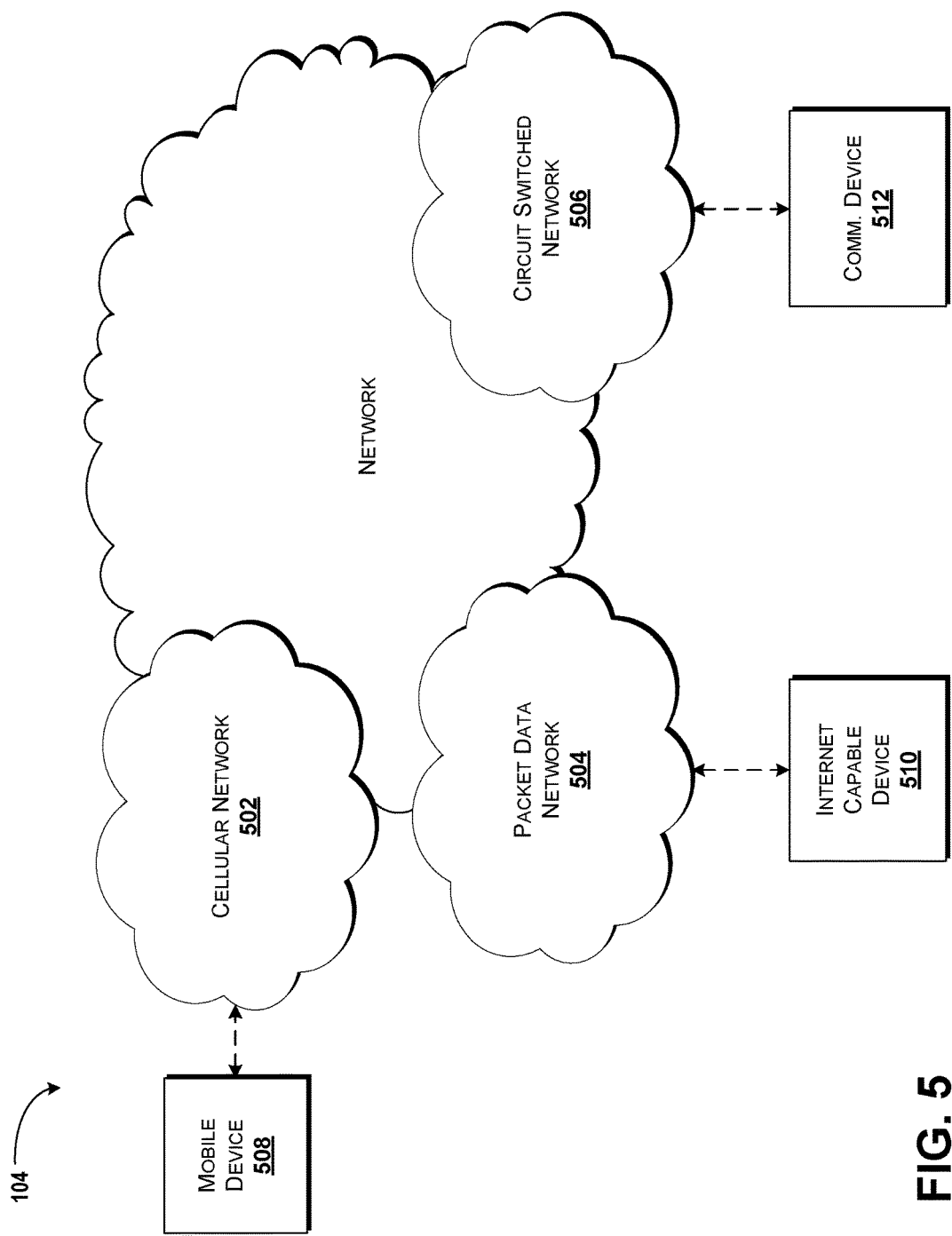
FIG. 5 schematically illustrates a network, according to an illustrative embodiment.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, servers, computers, databases, and other devices in communication with another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
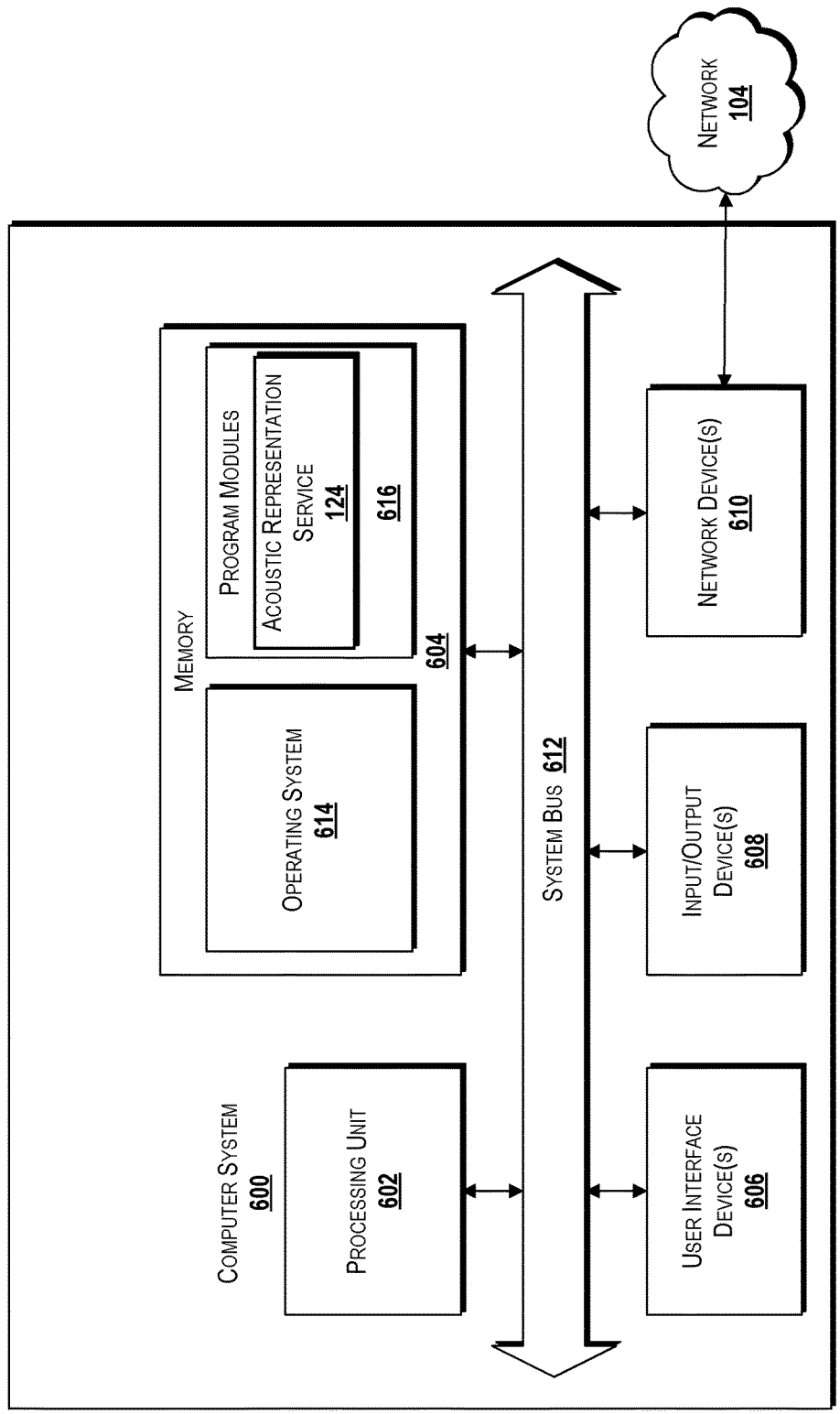
FIG. 6 is a block diagram illustrating an example computer system configured to provide acoustic representation data for generating acoustic representations of environments, according to some illustrative embodiments.

FIG. 6 is a block diagram illustrating a computer system 600 configured to provide the functionality described herein for generating and/or providing acoustic representations of environments, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the acoustic representation service 124. This and/or other programs can be embodied in computer-readable media containing instructions that, when executed by the processing unit 602, perform one or more of the methods 200, 300, 400 described in detail above with respect to FIGS. 2-4. According to embodiments, the program modules 616 may be embodied in hardware, software, firmware, or any combination thereof. Although not shown in FIG. 6, it should be understood that the memory 604 also can be configured to store the input data 122, the object library 128, the user data 130, the acoustic representation data 134, and/or other data, if desired. In some embodiments, wherein the user device 102 has an architecture similar to the computer system 600 shown in FIG. 6, the memory 604 can store the captured data 116, the acoustic representation 118, and/or the preferences 120.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
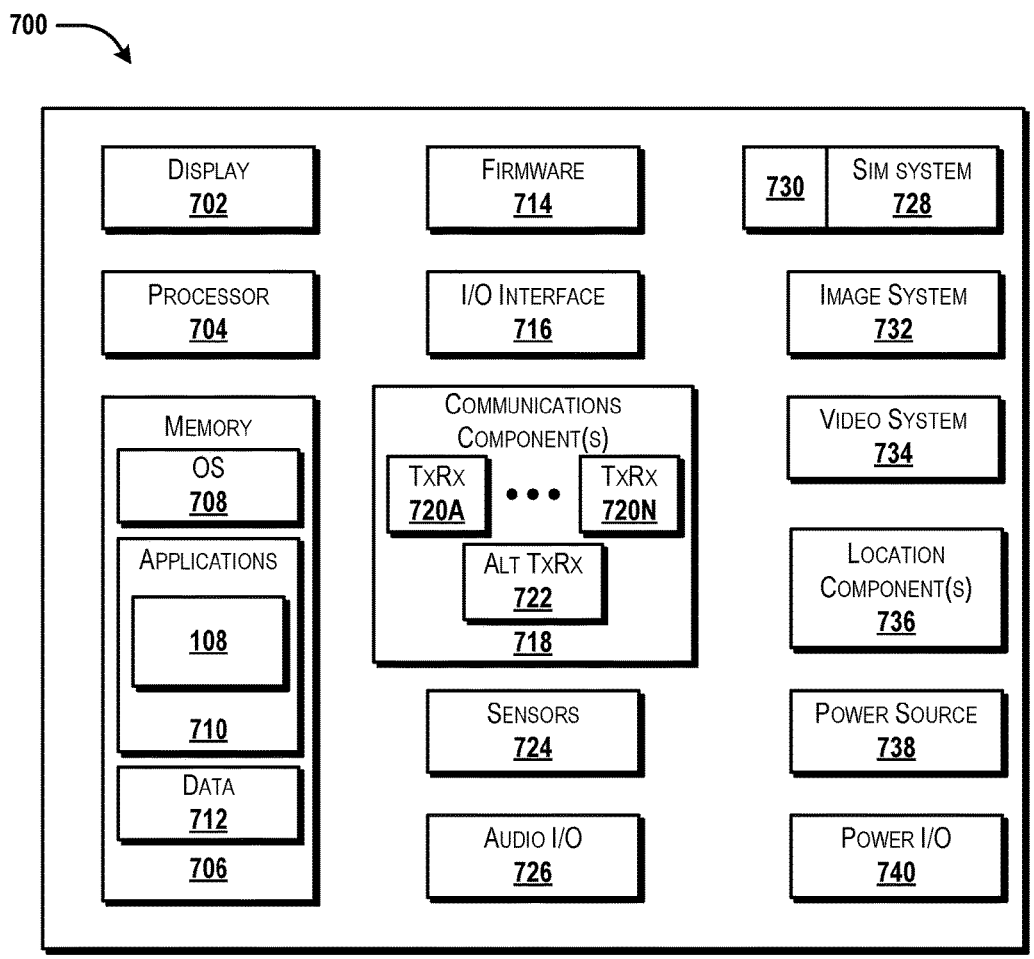
FIG. 7 is a block diagram illustrating an example mobile device configured to interact with an acoustic representation service, according to some illustrative embodiments.

Turning now to FIG. 7, an illustrative mobile device 700 and components thereof will be described. In some embodiments, the user device 102 described above with reference to FIGS. 1-6 can be configured as and/or can have an architecture similar or identical to the mobile device 700 described herein in FIG. 7. It should be understood, however, that the user device 102 may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements for UI information from this application, text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the acoustic representation application 108, other computer-executable instructions stored in a memory 706, or the like. In some embodiments, the applications 710 also can include a UI application (not illustrated in FIG. 7).

The UI application can interface with the operating system 708, such as the operating system 106 shown in FIG. 1, to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, entering preferences 120, building or modifying an object library 128, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. The data 712 can include, for example, captured data 116, the acoustic representation 118, the preferences 120, the input data 122, the object library 128, the user data 130, the acoustic representation data 134, other data, and/or other applications or program modules. According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the network 104 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/ WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/ or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Based on the foregoing, it should be appreciated that systems and methods for generating and providing acoustic representations of environments have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
   obtaining, by a device comprising a processor, captured data from collection hardware comprising a video capture device that is in communication with the device;
   determining, by the device, if device-side processing is available;
   in response to a determination that the device-side processing is available, analyzing, by the device, the captured data to adjust a frame rate for video included in the captured data;
   sending, by the device and directed to a service, input data comprising a portion of the captured data, wherein the service is configured to recognize, based on the input data, an object and a path of movement associated with the object; and
   receiving, by the device, acoustic representation data that represents the object and the path of movement.

2. The method of claim 1, further comprising:
   providing, by the device, the acoustic representation data to an output device.

3. The method of claim 1, wherein the device-side processing comprises preprocessing the captured data by the device.

4. The method of claim 1, wherein the device-side processing comprises adjusting the frame rate based on an analysis of the captured data.

5. The method of claim 1, further comprising:
   sending, by the device and directed to the service, a request to build an object library; and
   sending, by the device, another input data to the service.

6. The method of claim 5, wherein the service identifies another object represented by the other input data and adds data identifying the other object to the object library.

7. The method of claim 1, wherein the captured data comprises:
   the video;
   audio; and
   a sensor reading that is obtained via a sensor of the device.

8. The method of claim 1, wherein the captured data comprises three hundred sixty degree video.

9. A device comprising:
   a processor; and
   a memory that stores computer-executable instructions that, when executed by the processor, cause the processor to perform operations comprising
      obtaining captured data from collection hardware comprising a video capture device,
      determining if device-side processing is available,
      in response to a determination that the device-side processing is available, analyzing the captured data to adjust a frame rate for video included in the captured data,
      sending, directed to a service, input data comprising a portion of the captured data, wherein the service is configured to recognize, based on the input data, an object and a path of movement associated with the object, and
      receiving acoustic representation data that represents the object and the path of movement.

10. The device of claim 9, wherein the computer-executable instructions, when executed by the processor, cause the processor to perform operations further comprising:

providing the acoustic representation data to an output device.

11. The device of claim 9, wherein the computer-executable instructions, when executed by the processor, cause the processor to perform operations further comprising:
sending, directed to the service, a request to build an object library; and
sending another input data to the service.

12. The device of claim 11, wherein the service is configured to identify another object represented by the other input data and adds data identifying the other object to the object library.

13. The device of claim 9, wherein the captured data comprises three hundred sixty degree video.

14. The device of claim 9, wherein the captured data comprises:
the video;
audio; and
a sensor reading that is obtained via a sensor.

15. A computer storage medium having computer-executable instructions stored thereon that, when executed by a processor, cause the processor to perform operations comprising:
obtaining captured data from collection hardware comprising a video capture device;
determining if device-side processing is available;
in response to a determination that the device-side processing is available, analyzing the captured data to adjust a frame rate for video included in the captured data;
sending, directed to a service, input data comprising a portion of the captured data, wherein the service is configured to recognize, based on the input data, an object and a path of movement associated with the object; and
receiving acoustic representation data that represents the object and the path of movement.

16. The computer storage medium of claim 15, wherein the computer-executable instructions, when executed by the processor, cause the processor to perform operations further comprising:
providing the acoustic representation data to an output device.

17. The computer storage medium of claim 15, wherein the computer-executable instructions, when executed by the processor, cause the processor to perform operations further comprising:
sending, directed to the service, a request to build an object library; and
sending another input data to the service.

18. The computer storage medium of claim 17, wherein the service is configured to identify another object represented by the other input data and adds data identifying the other object to the object library.

19. The computer storage medium of claim 15, wherein the captured data comprises three hundred sixty degree video.

20. The computer storage medium of claim 15, wherein the captured data comprises:
the video;
audio; and
a sensor reading that is obtained via a sensor.

* * * * *